(12) United States Patent
Vasechkin et al.

(10) Patent No.: US 6,335,858 B1
(45) Date of Patent: Jan. 1, 2002

(54) CAPACITOR WITH DUAL ELECTRIC LAYER

(75) Inventors: Vladimir Ivanovich Vasechkin, Moskovskaya obl.; Jury Mironovich Volfkovich, Moscow; Pavel Andreevich Shmatko, Moskovskaya obl.; Evgeny Alexandrovich Ashmarin, Moskovskaya obl.; Oleg Grigorievich Dashko, Moskovskaya obl., all of (RU)

(73) Assignee: Nauchno-Proizvodstvennoe Predpriyatie "Exin", Moscow (RU)

( * ) Notice: Subject to any disclaimer, the term of this patent is extended or adjusted under 35 U.S.C. 154(b) by 0 days.

(21) Appl. No.: 09/581,737
(22) PCT Filed: Dec. 18, 1997
(86) PCT No.: PCT/RU97/00410
§ 371 Date: Aug. 16, 2000
§ 102(e) Date: Aug. 16, 2000
(87) PCT Pub. No.: WO99/31687
PCT Pub. Date: Jun. 24, 1999
(51) Int. Cl.$^7$ ................................................. H01G 9/00
(52) U.S. Cl. .................. 361/502; 361/505; 361/512; 361/508; 361/517; 29/25.03
(58) Field of Search ...................... 361/512, 502, 361/313, 321, 303, 516, 528, 508, 517, 519; 29/25.03

(56) References Cited

U.S. PATENT DOCUMENTS

| 4,313,084 | A | | 1/1982 | Hosokawa et al. |
| 4,562,511 | A | | 12/1985 | Nishino et al. |
| 4,896,249 | A | | 1/1990 | Endo et al. |
| 6,031,712 | A | * | 2/2000 | Kurihara et al. ............ 361/502 |
| 6,083,829 | A | * | 7/2000 | Lai et al. .................... 438/643 |
| 6,134,760 | A | * | 10/2000 | Mushiake et al. ......... 29/25.03 |
| 6,198,621 | B1 | * | 3/2001 | Saito et al. ................. 361/502 |

FOREIGN PATENT DOCUMENTS

| WO | 92/12521 | 7/1992 |
| WO | 97/07518 | 2/1997 |

OTHER PUBLICATIONS

Yu. M. Vlofkovich and V.S. Bagotzky, J. Power Sources, 1994, v. 48, pp. 327–348. (enclosed).

* cited by examiner

Primary Examiner—Dean A. Reichard
Assistant Examiner—Nguyen T Ha
(74) Attorney, Agent, or Firm—Collard & Roe, P.C.

(57) ABSTRACT

A dual electric layer capacitor containing two electrodes of which one or both are polarizable, liquid electrolyte, and a separator. The degree of filling the pores of the separator and of both elements is between 40& and 90% of a total volume of the pores.

6 Claims, 3 Drawing Sheets

CAPACITOR WITH DUAL ELECTRIC LAYER

TECHNICAL FIELD

The invention relates to electrical engineering, in particular, to capacitor-making industry and can find application in producing high-capacity electric capacitors making use of double electric layer (DEL). Capacitors with DEL have found application as stand-by power sources in systems requiring uninterrupted power supply, such as computation engineering, communications equipment, numerically controlled machine tools, in uninterrupted cycle production processes; for electric-starter starting of diesel engines; for power supply of invalid carriages, golf carriages, etc.

BACKGROUND ART

Known in the art presently are electric energy accumulators appearing double electric layer (DEL) capacitors, e.g., those disclosed in U.S. Pat. No. 4,313,084 (1982) and 4,562,511 (1985). Said capacitors comprise each two porous polarizable electrodes and porous separator made of a dielectric material and placed therebetween, and current leads. A liquid electrolyte solution in the capacity of which either aqueous or non aqueous electrolytes are used (is contained in the pores of the electrodes and separator, as well in a certain free space inside the capacitor casing. Electric charge is accumulated on an interphase surface in the pores between the electrode material and the electrolyte. Used as the materials of polarizable electrodes are various routine porous carbon materials. To increase the capacitor capacitance with double electric layer said carbon materials are subjected to preactivation with a view to increasing their specific surface area up to 300–3000 sq.m/g.

DEL capacitors have much higher capacity compared with routine film-type and electrolytic capacitors, i.e., up to a few scores of Farads per gram of active electrode materials. However, such capacitors suffer from a rather specific energy, i.e., not more than 3 watt-hours/lit.

Another disadvantage inherent in DEL capacitors resides in evolving gases during recharging, e.g., oxygen on the positive electrode and/or hydrogen on the negative electrode. The fact is due to the fact that the potential of evolution of said gases on the respective electrodes is reached during recharging. The result is an increased pressure of the gases inside the capacitor casing which may lead to its depressurization and even blasting if no provision is made for a special pressure release valve. However, operating reliability of such valves is frequently inadequate to ensure against such depressurization or blasting due to their getting clogged with dirt, and so on. It is for said and other reasons that DEL capacitors suffer from a fundamental disadvantage, that is, a danger of their depressurization and even blasting which involves special service and maintenance thereof. To provide more reliable prevention of depressurization during recharging, one should considerably reduce the final charging voltage for the sake of "double insurance", whence the initial discharge voltage is reduced, too so as not to approach a dangerous border-line. This in turn results in a considerable drop of the specific energy of the DEL capacitor which, as is commonly known, is directly proportional to the squared specific energy of the DEL capacitor which, as is commonly known, is directly proportional to the squared difference between the initial and final discharge voltage values.

Known in the present state of the art is a DEL capacitor (cf. WO 97/07518 of Feb. 27, 1997) having a polarizable electrode made of a porous carbon material, and a non-polarizable electrode made of nickel oxide. Used as electrolyte is an aqueous carbonate or hydroxide of an alkali metal. Such a capacitor gives much more specific energy value compared with a DEL capacitor having two polazable electrodes (up to 45 J/cu.cm or 12.5 W-h/lit), and a maximum voltage of 1.4 V. However, the capacitor described before yet suffers from substantial disadvantages, that is, the problem of how to provide its complete pressurization and need in special service and maintenance thereof. As a result of non-provision of a complete pressurization of the capacitor are reduced values of a maximum charging voltage and specific energy, as well as inadequately high charging current values and hence too long a charging time.

DISCLOSURE OF THE INVENTION

It is an object of the present invention to provide a completely pressurized service—and attendance-free capacitor.

It is another object of the invention to enhance the specific energy of the capacitor and to reduce the charging time.

The foregoing objects are accomplished due to the herein-disclosed invention whose essence resides in that in a dual electric layer capacitor comprising two electrodes of which either one or both are polarizable, a liquid electrolyte, and a separator, the degree of filling the void space of the separator and of both electrodes with electrolyte falls within 90 and 40%.

The essence of the present technical solution resides in that gaseous oxygen liberated on the positive electrode of a DEL capacitor at the end of charging and during recharging is basically absorbable completely on the negative electrode during its ionization reaction (electric reduction) due to very high polarization of said reaction ($E_p > 1$ V) and due to the fact that the activated carbon is a very good catalyst for the process in question, whereby it is made use of in fuel cells (cf. "Chemical current sources" by V. S. Bagotski and A. M. Skunden, Moscow, "Energhia" PH, 1981, pp. 80, 116 (in Russian). On the other hand, gaseous hydrogen which can be liberated on the negative electrode during recharging a DEL capacitor, can substantially be absorbed completely on the positive electrode during its ionization reaction (electric oxidation) due to a very high polarization of said reaction ($E_p > 1$ V). However, in routine DEL capacitors the pores of the separator and of both electrodes are filled with electrolyte virtually completely so that gas porosity in said porous bodies is virtually absent. Under such conditions very much trouble is encountered as regards diffusion as far as the transfer of the gases liberated during the charging and recharging procedures, from one electrode to the other is concerned. The point is that the mechanism of such a transfer consists in dissolving said gases in liquid electrolyte contained in the pores of the electrode, wherein it is generated, in its diffusing in a dissolved state over the flooded pores of said electrode, of the separator and of thee opposite electrode, the reaction of its ionization occurring not until said operations are completed. It is due to very low solubility of hydrogen and oxygen in liquid electrolytes under standard conditions and thereby very low corresponding value of the diffusion coefficient that the resultant ionization rate of said gases on the opposite electrodes with a virtually completely filled void space of the separator and of both electrodes is very low, too. Said rate is likewise as low even in cases where one or both electrodes feature certain gas porosity whereas the separator pores are footed completely. Very low rate of transfer of the gases between the electrodes is much less their generation rate during recharging, whereby the pressure inside the capacitor casing increases which is fraught with its depressurization and even with blasting.

An inventive concept underlying the present invention consists in that a single system of gas pores is established in a DEL capacitor throughout the entire electrochemical group (ECGp) thereof, comprising porous electrodes and a porous separator. Thus, oxygen and hydrogen gases which are liberated during capacitor charging and recharging are conveyed very rapidly along said system to the opposite electrodes whereon both gases undergo ionization to form water or respective ions (H+, OH, and others). The fact is that the diffusion coefficients of gases in the gaseous phase is four orders of magnitude higher than that in the liquid phase. Such a system of gas pores is provided due to the fact that the void space of both porous electrodes and the porous separator having a degree of filling of their pores within 90 and 40%. Hence the proportion of a non-filled void space of gas pores (gas porosity) in each of the porous body of the ECGp falls within 10 and 60%, with the result that the required system of gas pores is established. Further reduction of the degree of filling the ECGp with electrolyte is undesirable as fraught with an appreciable increase in the internal resistance of the capacitor.

To establish gas porosity can be provided by a variety of techniques, one of which being applicable whenever electrolyte is contained only in the pores of the electrodes and of the separator, i.e., when no free electrolyte is present in the capacitor. The definite values of a degree of filling the void space in the electrodes and separator in the aforementioned range from 90 to 40% of a total space is attainable, firstly, due to appropriately measuring out a full amount of electrolyte introduced into the capacitor, and secondly, by using electrodes and a separator with definite mutually coordinated porous structures. As a matter of fact, distribution of a liquid inside a system of mutually contacting porous bodies depends quantitatively on the size distribution curves (porograms) of the pores of said porous bodies. The nature of said quantitative dependence has been established in the following papers (cf. Volfkovich Yu. M. the Journal "Elektrokhimia", 1978, v. 14, #4, p.546, vol. 14, #6, p.831; #10, p. 1477 (in Russian); Volfkovich Yu. M. and Bagotzky V. S. Power Sources, 1994, v. 48, pp. 327, 339). For instance, with an increased proportion of large pores in a separator compared with electrodes, the degree of filling the separator pores is decreased compared with said electrodes. Control over the execution of the preset values of the degree of filling of pores in each porous body of the ECGp may be carried out, firstly, by weighing the separator and electrodes both in a fully flooded stated (under vacuum) and following a working impregnation of the separator and electrodes, assembling the capacitor and its subsequent disassembling; and secondly, by taking the porograms of the electrodes and separator, as well as by weighing the entire ECGp before and after impregnation with electrolyte.

In order to fulfil the aforestated condition as to electrolyte containing only in the pores of the electrodes and of the separator, it is reasonable that one capacitor or a bank of capacitor elements be held between the load-bearing cover of the casing as otherwise the capacitor internal resistance is increased.

Another method for providing the required gas porosity of the electrodes and separator consists in that a dispersed water repellant is added to one or both electrodes and/or to the separator appearing as, e.g., polytetrafluoroethylene or polyethylene. Water-repellency treatment of the negative electrode increases the rate of diffusion of the electrolyte-dissolved oxygen inside the pores directly to the internal electrode/electrolyte interface and the resultant higher rate of its electric reduction. Insofar as capacitor recharging as a result of misoperation (with E<0 V) must not be ruled out completely, hydrogen is liable to evolve on the negative electrode. Adding a dispersed water repellant to the positive electrode accelerates abruptly the process of hydrogen transporting to the inner surface thereof and the resultant process of hydrogen electric oxidation on said electrode. Thus, adding water repellants to the composition of porous electrodes helps solving the problem of creating completely pressurized capacitor.

EXEMPLARY EMBODIMENTS OF THE INVENTION

Example 1

Figure 1:
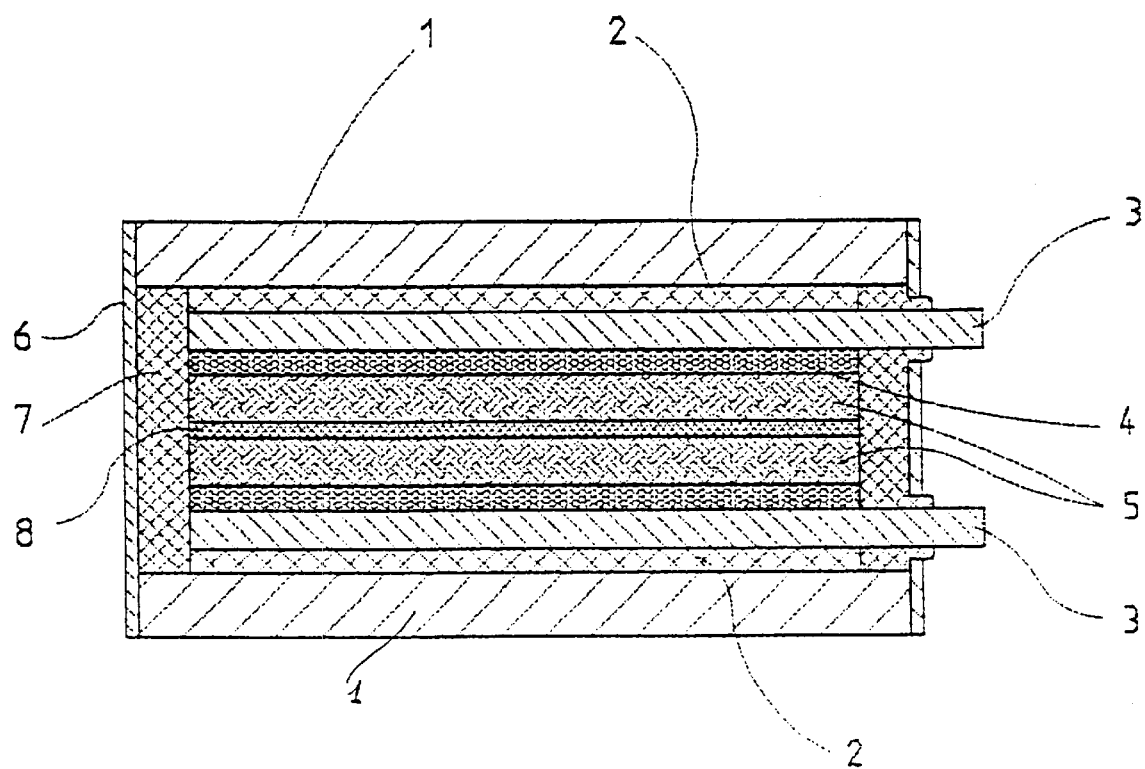
FIG. 1 illustrates an embodiment of the capacitor, according to the present invention.

The capacitor with dual electric layer (FIG. 1) is composed of two similar polarizable electrodes (5) made of three layers of activated carbon fabric, type "Viscumac" having a specific surface area of 1200 sq.m/g and a total thickness of 0.9 mm, a porous separator (8), grade ΦIIII-20CA, made from perchlorovinyl having a total thickness of 120 microns, current leads (3) made of steel; a 0.3 mm thick steel load-bearing cover (1) of the casing; a 0.3 mm thick load-bearing side panel (6) of the casing; a non-conducting sealant (7) made from atactic polypropylene; and an insulator (2) made from rigid PVC. The protective layer (4) of the current lead is made of graphite film 0.3 mm thick impregnated with an acid-resistant polymer and adhesive-bonded at several points to the metal electrode of the current lead. Both electrodes appear as plates each measuring 123× 143 mm. Used as electrolyte is a sulfuric acid solution having density of 1.3 g/cu.cm. The capacitor is compressed, the compressing pressure of the ECGP being 3 kg/sq.cm. Electrolyte is located only in the pores of the ECGp. The degrees of filling the void space with electrolyte as measured by weighing are as follows: for electrodes, 73%; for separator, 81%.

The following characteristics are obtained as a result of testing: maximum voltage, 1 V; specific energy, 2 W-h/lit; maximum excess pressure of gases as measured inside the casing, 0.02 atm.

Example 2

Figure 2:
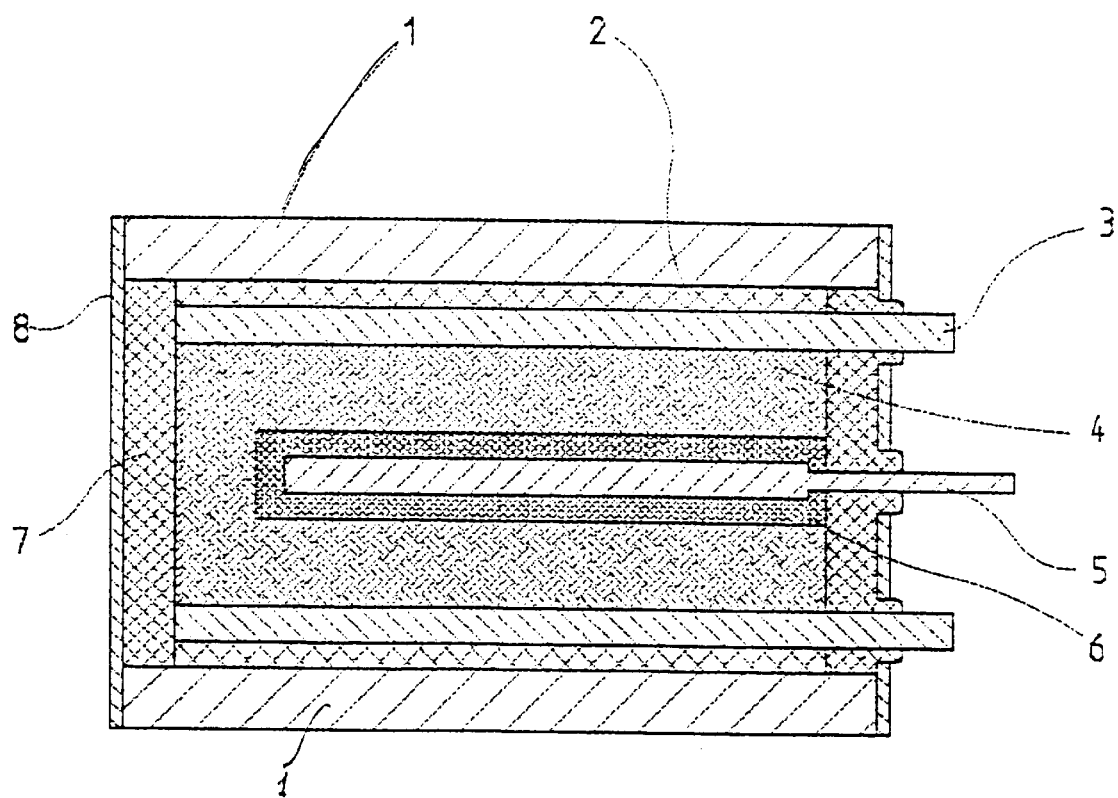
FIG. 2 illustrates an alternative embodiment of the capacitor, according to the present invention.
Figure 3:
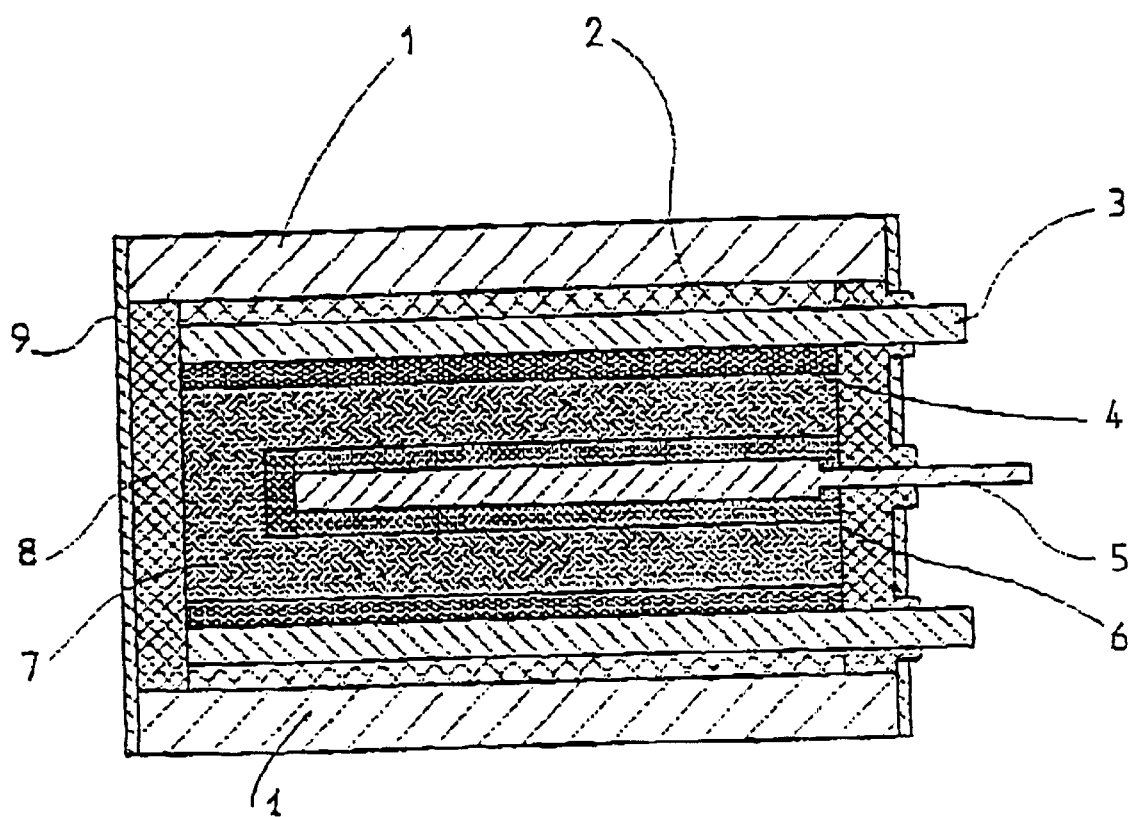
FIG. 3 illustrates a further embodiment of the capacitor, according to the present invention.

The capacitor with dual electric layer (FIG. 2) is composed of the following components.

A negative polarzible electrode (4) is made of ten layers of activated carbon fabric, type "Viscumac" having a specific surface area of 1200 sq.m/g. A positive (non-polarizable) electrode (5) contains an active material of nickel hydroxide (NiOH3). A grade ΦIIII-20CA polypropylene-made 60 micron thick separator (6) is used. Current leads (3) of both electrodes are made from sheet nickel. Each of the electrodes appears as a plate measuring 123×143 mm. A sheet-steel load-bearing cover (1) and a load-bearing side panel (8) of the casing are used for compressing the capacitor ECGp. A non-conducting sealant (7) is made from atactic polypropylene and an insulator (2), from rigid PVC. Used as electrolyte is a 30% aqueous potassium hydroxide. The compressing pressure of the ECGP is 10 kg/sq.cm. The degrees of filling the void space with electrolyte as measured by weighing are as follows: for the negative electrodes 63%; for the positive electrode, 71%; for the separator, 79%. The capacitor is assembled under vacuum. The overall dimensions of the entire assembly are 130×150×14 mm.

The following characteristics are obtained as a result of testing: maximum voltage, 1.45 V; specific, energy, 16 W-h/lit; internal resistance, 2.5 mOhm; charging time, 20 min; maximum excess pressure of gases as measured inside the casing, 0.01 atm.

Example 3

The capacitor with dual electric layer (FIG. 2) is composed of the following components.

A negative polarizable electrode (7) is made by molding and sinterig a mixture comprising 20% powdered polyethylene and 80% activated powdered carbon, grade АГ-3 having a specific surface area of 1100 sq.m/g. The electrode (7) is 3 mm thick. A positive non-polarizable electrode (5) consists of a grid made of an alloy containing 95% lead and 5% antimony. Put inside the grid cells is a mixture comprising 85% lead sulfate and 15% polytetrafluoroethylene. A 60 micron thick, grade ФIIII-20CA, perchlorovinyl separator (6) impregnated with a 15% PTFE-based lacquer Current leads (3) are made of sheet steel. The protective layer (4) of the current lead is made of graphite film impregnated with a 0.3 mmn thick acid-resistant polymer, said film being bonded at several points to the metallic electrode of the current lead. Each electrode appears as a plate measuring 123×143 mm. A load-bearing cover (1) and a load-bearing side panel (9) of the casing are made of sheet steel and are used for compressing the capacitor ECGp. A non-conducting sealant (8) is made from atactic polypropylene and an insulator (2), of rigid PVC. Used as electrolyte is aqueous sulfuric acid having a density of 1.05 g/cu.cm. The compressing pressure of the ECGp is 10 kg/sq.cm. The degrees of filling the void space with electrolyte as measured by weighing are as follows: for the negative electrode, 63%; for the positive electrode, 71%; for the separator, 79%. The capacitor is assembled under vacuum. The overall dimensions of the entire assembly are 130×150×17 mm.

The following characteristics are obtained as a result of testing: maximum voltage, 2 V; specific energy with a discharge current of 2.5 A, 51 W-h/lit; the number of the attainable charging-discharge cycles, 6500; internal resistance, 2 mOhm; charging time, 15 min; maximum excess pressure of gases as measured inside the casing, 0.01 atm.

As is evident from the presented Examples of practical realization of the invention, the obtained maximum excess pressure of gases measured inside the casing of all the tested DEL capacitors is within 0.01–0.02 atm. These values are very low and are much lower than the ultimate strength of the capacitor casings, whereby they present no danger of their depressurizig.

INDUSTRIAL APPLICABILITY

The invention disclosed hereinbefore solves the problem of providing complete pressurization of any type of DEL capacitors having both one or two polarizable electrodes. As a result of practical solution of the problem a higher specific energy is attained due to an increased maximum charging voltage on account of no danger of capacitor depressurization. For the same reason a possibility arises of considerably increasing the charging current and hence a corresponding reducing the charging time which is of paramount importance for a great many practical uses of the present capacitor.

One more positive outcome of practical application of the herein-proposed technical solution, that is, containing electrolyte only in a part of the void space of electrodes and of separator and absence of free electrolyte, resides in the fact that serviceability and characteristics of a DEL capacitor become completely independent of the capacitor spatial position, i.e., horizontal, vertical, and so on. For the same reason the proposed capacitor must operate normally in the objects moving at high acceleration rates, such as motor cars, aircraft, space vehicles, and so on.

Finally, capacitors made in accordance with the present invention needs no special attendance.

What is claimed is:

1. A dual electric layer capacitor comprising a casing accommodating two electrodes of which either one or both are polarizable, a separator, and liquid electrolyte, both electrodes and the separator have a porous structure, and a degree of filling the pores of the separator and of both electrodes with electrolyte falls between 40% and 90% of a total volume of the pores.

2. A capacitor according to claim 1, wherein electrolyte is contained only in the pores of the electrodes and of the separator.

3. A capacitor according to claim 1, wherein one or both electrodes comprises a material that is doped with a dispersed water repellant.

4. A capacitor according to claim 1, wherein the separator comprises a material that is doped with a dispersed water repellant.

5. A capacitor according to claim 1, wherein the capacitor comprises a vacuumized interior.

6. A capacitor according to claim 1, wherein the capacitor is compressed.

* * * * *